June 17, 1969

R. A. SEDERQUIST ET AL  3,450,567

METHOD FOR PRODUCING HYDROGEN FROM HYDROGEN-CONTAINING
FEEDSTOCKS FOR USE IN FUEL CELL

Filed Aug. 3, 1965

INVENTORS
RICHARD F. BUSWELL
RICHARD A. SEDERQUIST
HERBERT J. SETZER

BY

*Charles A. Warren*

ATTORNEY

United States Patent Office 3,450,567
Patented June 17, 1969

3,450,567
METHOD FOR PRODUCING HYDROGEN FROM HYDROGEN-CONTAINING FEEDSTOCKS FOR USE IN FUEL CELL
Richard A. Sederquist, Newington, Richard F. Buswell, Glastonbury, and Herbert J. Setzer, Ellington, Conn., assignors to United Aircraft Corporation, East Hartford, Conn., a corporation of Delaware
Filed Aug. 3, 1965, Ser. No. 476,891
Int. Cl. H01m *27/06, 27/12, 27/30*
U.S. Cl. 136—86                                9 Claims

ABSTRACT OF THE DISCLOSURE

A hydrogen-containing, carbonaceous feedstock is admixed with water vapor and passed into contact with a bed of dehydrogenation catalyst at low temperatures and pressures to effect catalytic reforming of only a portion of the feedstock. The conditions of temperature, pressure and space velocity are selected with respect to the catalyst so as to produce an effluent stream of high quality in terms of hydrogen produced.

---

The present invention relates to the conversion of hydrogen-containing carbonaceous feedstocks, and more particularly, to a novel catalytic method for obtaining hydrogen from hydrogen-containing carbonaceous feedstocks.

Because of a desire to produce electric current from relatively small power plants, there have been considerable efforts in the area of fuel cells wherein the energy generated by an oxidation-reduction chemical reaction at spaced electrodes is directly converted into electrical energy to operate in an external circuit between the electrode devices which provide a load. Although some fuel cells have been proposed which utilize relatively impure hydrogen or other oxidizable fuels, generally pure hydrogen has been recognized as the preferred fuel and its coreactant has generally been oxygen or the oxygen in air.

Although various techniques have been proposed for converting hydrocarbons and other hydrogen-containing carbonaceous feedstocks into hydrogen for use in such cells, generally primary emphasis has been placed upon catalytic conversion at relatively high temperatures; i.e., about 700° centigrade. Passage of the resultant gas stream through purifiers employing such means as palladium membranes which are selectively permeable to hydrogen has been employed to minimize the impurities which might contaminate the fuel cell electrolyte which is generally alkaline.

It is an object of the present invention to provide a novel method for obtaining a relatively high-quality hydrogen stream from hydrogen-containing carbonaceous feedstocks at relatively low temperatures, thus enabling elimination of high temperature reformers and shift converters.

Another object is to provide such a method for catalytically reforming hydrocarbon fuels to a product stream which is relatively high in hydrogen content and which may be operated effectively at low temperatures and pressures.

Still another object is to provide a novel method for low temperature hydrocarbon reformation in a reforming fuel cell.

Other objects and advantages will be readily apparent from the following detailed specification and claims and the appended drawing wherein:

Figure 1:
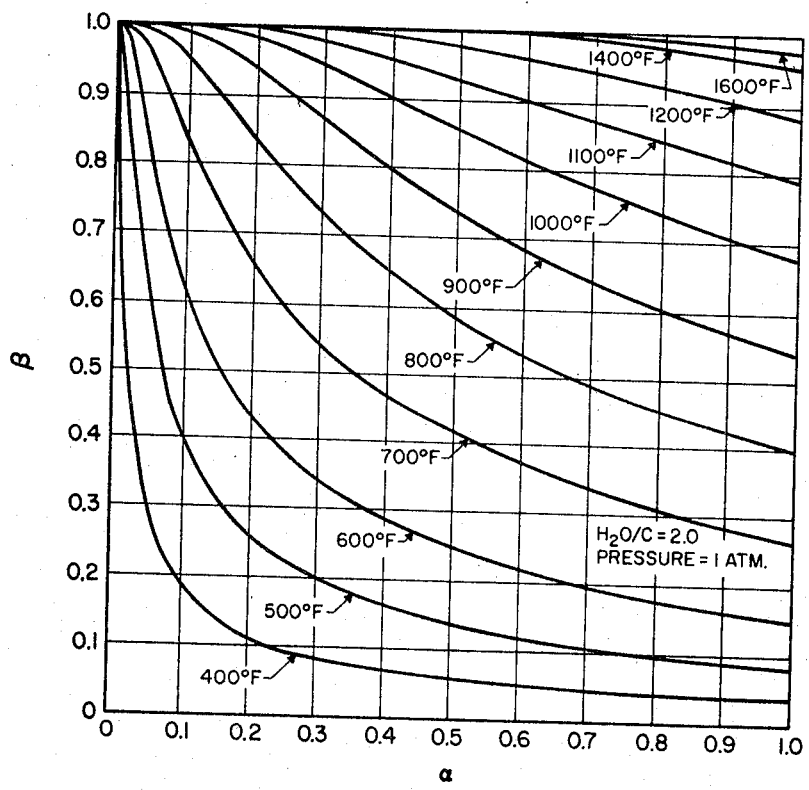
FIGURE 1 is a graph illustrating the effect of temperature and percentage of feedstock reacted on the quality of hydrogen produced in the reforming reaction of the present invention.

It has now been found that the foregoing and related objects may be readily attained by a method in which a hydrogen-containing carbonaceous feedstock containing 5 to 16 carbon atoms is admixed with water vapor and then passed in gaseous form at a temperature of about 100 to 590° centigrade into contact with a dehydrogenation catalyst maintained at a temperature of about 125 to 590° centigrade to produce a catalytic reforming reaction in a portion of the feedstock. The term "dehydrogenation catalyst" as used herein refers to a stream reforming catalyst of the type which will reform hydrogen-containing carbonaceous feedstocks to products including hydrogen, carbon oxides and methane. The temperature, pressure and space velocity of the reforming reaction are selected with respect to the catalyst to produce reaction of about 5 to 55 percent by weight of the feedstock with the reaction products in the effluent stream providing a value for $\beta$ of not less than about 0.7 in the following equation:

$\beta$(Quality of hydrogen produced) =

$$\frac{\text{total moles hydrogen actually produced}}{\text{moles hydrogen theoretically obtainable from the amount of a fuel reacted (with no methane production)}}$$

More particularly, applicants have found that a high-quality hydrogen reaction product stream may be obtained from reactions wherein relatively low amounts of fuel are reacted at relatively low temperatures. By proper selection of the catalyst and the conditions of operation with respect to that catalyst, the reforming process may be conducted so as to cause reaction or breakdown of only a relatively small percentage of the feedstock but under such conditions that the reacted feedstock is substantially completely converted to the end products of hydrogen and carbon dioxide. Although the theory of operation is not completely understood, it is considered that applicants have found a low temperature quasi-equilibrium state involving predominately the reaction products of hydrogen and carbon dioxide together with the initial reactants of heavy hydrocarbon and water. The general reaction or equation for the aforementioned low temperature quasi-equilibrium state may be described as follows:

$$(CH_m)n + 2nH_2 \rightleftharpoons nCO_2 + n\left(2 + \frac{m}{2}\right)H_2$$

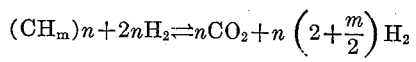

wherein $n$ equals the number of carbon atoms in the fuel and $m$ equals the number of hydrogen atoms per atom of carbon in the fuel.

By the discovery of the above phenomenon, applicants have been able to obtain a high-quality hydrogen output at relatively low temperatures so as to minimize or avoid the need for high temperatures and successive reform and shift reactors. The high quality of hydrogen concentration in the effluent stream enables a high degree of efficiency in hydrogen abstraction processes so that the method of the present invention is adapted to low-temperature reforming fuel cells.

The above phenomenon is in contrast with the conventional equilibrium considerations for reformation of liquid hydrocarbons which predict predominate conversion to methane at low temperatures and, therefore, have dictated the utilization of higher temperatures to reform the methane to the desired hydrogen and carbon oxide products.

However, the use of high temperatures results in excessive production of carbon monoxide so that generally the catalytic processes heretofore employed generally provide a low temperature shift converter to convert the carbon monoxide to carbon dioxide and additional hydrogen through its reaction with steam.

In the graph of FIGURE 1 of the attached drawing, there is illustrated a family of curves determined with respect to a single set of conditions of pressure and catalyst volume. As can be seen, the value for the quality of hydrogen or $\beta$ which represents the total moles of hydrogen actually produced in the effluent stream divided by the moles of hydrogen which might be obtained theoretically from the amount of fuel reacted assuming no production of methane tends to fall off sharply as the amount of fuel reacted increases at lower temperatures.

Although the reaction efficiency with respect to consumption of the feedstock is low, the high quality of hydrogen production in accordance with the present invention may be advantageously employed where high temperature limitations are quite significant and where it is desriable to eliminate or minimize the catalytic reactor equipment. Moreover, the relatively high concentration of hydrogen obtainable at low temperatures is advantageous from the standpoint of application of the method to continuous reaction equipment and to reforming fuel cells. In this connection, enhancement of the equilibrium phenomenon of the present invention may be provided by utilization of the concept described in the copending application of Herbert J. Setzer and Alfred C. Eggen, entitled Method and Apparatus for Catalytically Reforming Hydrogen-Containing Feedstocks, Ser. No. 476,878, filed Aug. 3, 1965, now abandoned, of which Ser. No. 716,276, filed Mar. 14, 1968, is a continuation-in-part. In this application, there is disclosed a method for the simultaneous abstraction of hydrogen produced during a catalytic reforming reaction by conducting the reaction in catalyst at one surface of a tube formed of a metal selectively permeable to hydrogen so that the substantially simultaneous extraction of the hydrogen from the reaction site through the wall of the tube tends to shift the equilibrium toward increased reaction.

In making the computations for description of the present concept, the fuel has been designated as $(CH_m)n$. The steam required has been based upon a molar ratio based upon moles of carbon since the stoichiometric ratio is 2.0 except for an alcohol or other oxygen-containing feedstock. In this manner, mixed fuels such as gasoline and various other hydrocarbon fractions can be accommodated despite the fact that the number of carbon atoms per mole in the fuel is often not known. In the equations for the reformer parameters the value of $n$ cancels out and so it need not be actually established for purposes of the present invention. However, the value of $m$ must be known and is easily calculable from the ratio of hydrogen to carbon for a mixed fuel which may be readily established.

Obviously, three general reactions may occur during the reformation of higher molecular weight hydrocarbon fuels:

(1) The conversion of the fuel:

$$(CH_m)n + H_2O \rightleftharpoons CO + H_2$$

and/or $$CO_2 + H_2$$

and/or $$CH_4 + H_2$$

(2) The shifting of the carbon monoxide:

$$CO + H_2O \rightleftharpoons CO_2 + H_2$$

(3) The reforming of methane:

$$CH_4 + H_2O \rightleftharpoons CO_2 + H_2$$

and/or $$CO + H_2$$

The foregoing reactions have not been balanced since the particular reaction path products would, of course, dictate the molar quantities of the reactants and products.

Obviously, each of the three above reaction parameters has the characteristic that, if none of the reactant is actually reacted, the value of the respective parameter is 0; however, if all of the reactant is reacted, the respective parameter is 1. In the case of the shift and reform parameters, the conversion only applies to that amount of the reactant which could have been formed from the fuel which has been converted. The reform conversion parameter is complicated by the fact that some carbon monoxide or carbon dioxide is generated when the fuel is converted to methane. Thus, some carbon monoxide or carbon dioxide would be present even if no methane is reformed. In practice, very small amounts of intermediate molecular weight hydrocarbons have been observed and they may be accommodated by adding them to the amount of unreacted fuel. The following is a solution for a general hydrocarbonaceous fuel:

$$(CH_mO_p)_n + {}_n\phi H_2O \rightarrow {}_n\alpha\theta\psi CO_2$$
$$+ {}_n\alpha\theta(1-\psi)CO$$
$$+ {}_n\alpha(1-\theta)CH_4$$
$$+ {}_n\alpha\left[\theta(3+\psi) - \left(2-\frac{m}{2}\right) - p\right]H_2$$
$$+ (1-\alpha)(CH_mO_p)_n$$
$$+ \{{}_n\phi - {}_n\alpha[\theta(1+\psi) - p]\} H_2O$$

wherein:

$$\theta = \frac{CO + CO_2}{CO + CO_2 + CH_4}$$

$$\psi = \frac{CO_2}{CO + CO_2}$$

$$\theta\psi = \frac{CO_2}{CO + CO_2 + CH_4}$$

As previous defined, the quality of hydrogen produced factor or $\beta$ equals the moles of hydrogen actually produced divided by the moles of hydrogen which could be produced theoretically from the reacted fuel if methane equals 0 for a given value of the fraction of fuel reaction ($\alpha$).

More particularly, the temperatures which may be employed in accordance with the present invention range from about 120 to about 590° centigrade. From the standpoint of obtaining a relatively high degree of reaction within the concepts of the present invention commensurate with the utilization of the low-temperature phenomenon, the preferred temperature range for the method is about 200 to 485° centigrade.

The pressures employed may vary between atmospheric and 100 pounds per square inch absolute. From the standpoint of minimization of equipment fabrication problems and high quality of hydrogen production, the preferred pressures are atmospheric to 40 pounds per square inch absolute. The space velocities may vary between 500 and 5000 hours$^{-1}$ depending upon the activity of the catalyst and temperatures and pressures employed.

Various hydrocarbonaceous fuels may be employed in the present process including paraffins, olefins, aromatics and alcohols containing from 5 to about 16 carbon atoms. The preferred fuels are saturated hydrocarbons containing 6 to 10 carbon atoms, and combinations thereof, either alone or with relatively small amounts of unsaturated hydrocarbons. Conveniently, hexane, heptane, octane, nonane, decane, and mixtures thereof, may be employed.

Because of the equilibrium factors of the present invention, a relatively low steam to carbon molar ratio may be employed; i.e., approaching the stoichiometric ratio of 2.0:1.0. Generally, the ratios employed are about 2.0 to 4.0:1.0. The catalysts may comprise any of the conventional dehydrogenation catalysts such as nickel, cobalt and platinum.

Figure 2:
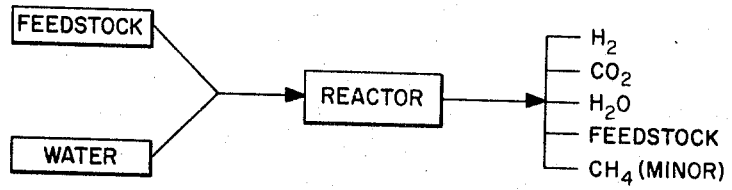
FIGURE 2 is a diagrammatic representation of a reforming process in accordance with the present invention.
Figure 3:
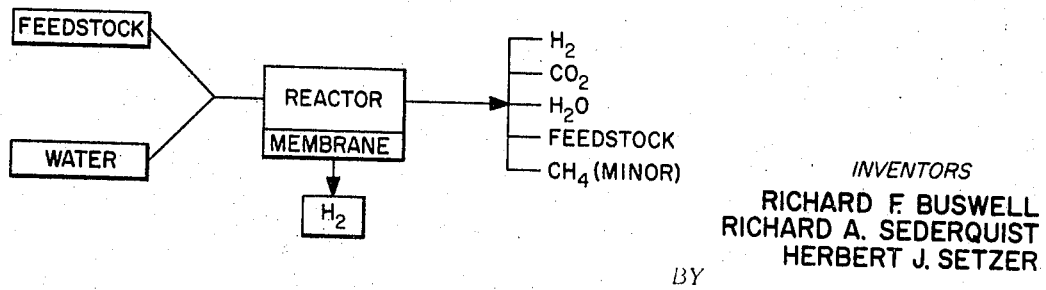
FIGURE 3 is a similar diagrammatic representation of another reforming process in accordance with the present invention.

Although the present invention may utilize fuel reaction of about 5 to about 55 percent by weight of the feedstock, preferably the amount of fuel reacted falls within the range of about 10 to 35 percent by weight in order to obtain the high quality hydrogen production while at the same time obtaining a reasonable degree of fuel reaction. Similarly, although the quality of hydrogen produced or $\beta$ may be as low as 0.7, it preferably is above 0.8 in order to obtain maximum value from the concepts of the present invention FIGURES 2 and 3 of the attached drawings diagrammatically represent processes embodying the present invention, with the latter employing the enhancement of operation provided by simultaneous abstraction of hydrogen from the reaction site.

Illustrative of the efficacy of the present invention are the following specific examples.

EXAMPLE 1

A fuel designated "JP-150," a Udex raffinate manufactured by Texaco, has a hydrogen to carbon ratio of 0.180 and contains 1.8 percent olefins and 0.8 percent aromatics according to A.S.T.M. Test D-1319. Its viscosity at 100° Fahrenheit is 0.73 and its specific gravity (A.P.I.) is 638. A distillation analysis on the Fahrenheit scale is as follows:

| | Degrees |
|---|---|
| Initial boiling point | 240 |
| 10 percent | 267 |
| 20 percent | 270 |
| 50 percent | 284 |
| 90 percent | 306 |
| End point | 335 |

A reactor bed comprising a proprietary nickel catalyst designated as "G-56" by Girdler Catalyst Company was maintained at a temperature of approximately 427° centigrade. A mixture of the above-mentioned fuel and steam in a water-to-carbon molar ratio of 2.5 was passed through the catalyst bed at a pressure of one atmosphere and at a space velocity of 2000 hours$^{-1}$.

Analysis of the effluent indicated the presence of hydrogen, carbon dioxide, water, methane and unreacted fuel. A quantitative analysis of the effluent from the reactor indicated that 20 percent of the fuel had been reacted and that the hydrogen constituted 18 percent of that which might have been evolved from the total reaction of all the fuel in the stream. However, on the basis of the amount of fuel reacted, the quality of hydrogen produced or the $\beta$ value was 0.90 indicating a very high degree of hydrogen conversion efficiency.

EXAMPLE 2

In a separate test employing the fuel of Example 1, the average temperature of the bed was maintained at approximately 538° centigrade and the space velocity was increased to 4000 hours$^{-1}$. The pressure was maintained at one atmosphere and the steam-to-carbon molar ratio was 2.5.

The exit analysis again indicated the presence of hydrogen, carbon dioxide, water, methane and unreacted fuel. In this particular test, 50 percent of the fuel was reacted and the amount of hydrogen produced was 45 percent of that theoretically available in the total volume of fuel. The quality of hydrogen produced or the $\beta$ value of the hydrogen in this particular test remained surprisingly high at 0.90.

Thus, it can be seen that the present invention provides a novel method for obtaining a relatively high-quality hydrogen content in the reaction product stream from conversion of hydrogen-containing carbonaceous feedstocks at relatively low temperatures. In this manner, high temperature reformers and shift converters may be eliminated and a process is provided which is adapted to low temperature reforming fuel cells. Although the amount of fuel consumed by the reaction is low, the corresponding increase in quality of hydrogen produced affords many advantages to the designer who must consider low temperature operation and minimization of the reactor components.

What is claimed is:

1. In the method of reforming hydrogen-containing carbonaceous feedstocks, the steps comprising: admixing a hydrogen-containing carbonaceous feedstock having a carbon chain from 5 to 16 carbon atoms and mixtures of feedstocks of such carbon chain length with water vapor in a steam to carbon molar ratio of about 2.0–4.0:1.0; and passing a gaseous stream of said admixture at a temperature of about 100 to 485° centigrade into contact with a dehydrogenation catalyst at a temperature of 200 to 485° centigrade and at a pressure of about atmospheric to 100 p.s.i.a. to produce a catalytic reforming reaction in a portion of said feedstock yielding methane, hydrogen and carbon oxide products, the temperature, pressure and space velocity of said reforming reaction being selected with respect to said catalyst to produce reaction of about 5 to 55 percent by weight of the feedstock with the reaction products in the effluent stream providing a value for $\beta$ of not less than about 0.7 in the equation:

$$\beta(\text{Quality of hydrogen produced}) = \frac{\text{total moles hydrogen actually produced}}{\substack{\text{moles hydrogen theoretically obtainable} \\ \text{from the amount of feedstock reacted} \\ \text{(with no methane production)}}}$$

2. The method in accordance with claim 1 wherein said hydrogen-containing carbonaceous feedstock consists predominantly of a saturated hydrocarbon.

3. The method in accordance with claim 1 wherein said feedstock contains 6 to 10 carbon atoms.

4. The method in accordance with claim 1 wherein about 10 to 35 percent of said feedstock is reacted and the value of $\beta$ is not less than about 0.8.

5. The method in accordance with claim 1 wherein said catalyst is provided within an anode of a reforming fuel cell.

6. The method in accordance with claim 1 wherein the space velocity employed is about 500–5000 hours$^{-1}$.

7. In the method of reforming hydrogen-containing carbonaceous feedstocks, the steps comprising: admixing a hydrogen-containing carbonaceous feedstock having a carbon chain from 5 to 16 carbon atoms and mixtures of feedstocks of such carbon chain length with water vapor in a steam to carbon molar ratio of about 2.0–4.0:1.0, and passing a gaseous stream of said admixture at a temperature of about 100 to 485° centigrade into contact with a dehydrogenation catalyst at a temperature of 200 to 485° centigrade and at a pressure of about atmospheric to 40 p.s.i.a. and a space velocity of about 500–5000 hours$^{-1}$ to produce a catalytic reforming reaction in a portion of said feedstock yielding methane, hydrogen and carbon oxide products, the temperature, pressure and space velocity of said reforming reaction being selected with respect to the catalyst to produce reaction of about 10 to 35 percent by weight of the feedstock with the reaction products in the effluent stream providing a value for $\beta$ of not less than 0.8 in the equation:

$$\beta(\text{Quality of hydrogen produced}) = \frac{\text{total moles hydrogen actually produced}}{\substack{\text{moles hydrogen theoretically obtainable} \\ \text{from the amount of feedstock reacted} \\ \text{(with no methane production)}}}$$

8. The method in accordance with claim 7 wherein said hydrogen-containing carbonaceous feedstock consists predominantly of a saturated hydrocarbon.

9. The method of claim 7 wherein said carbonaceous feedstock consists predominantly of a saturated hydrocarbon containing 6 to 10 carbon atoms.

References Cited

UNITED STATES PATENTS

| | | | |
|---|---|---|---|
| 3,027,237 | 3/1962 | McMullan | 23—212 X |
| 3,106,457 | 10/1963 | Lockerie et al. | 23—212 |
| 3,150,657 | 9/1964 | Shultz et al. | 136—86 X |
| 3,177,097 | 4/1965 | Beals | 136—86 |
| 3,222,132 | 12/1965 | Dowden | 23—212 |
| 3,259,523 | 7/1966 | Faris et al. | 136—86 |
| 3,266,938 | 8/1966 | Parker et al. | 136—86 |
| 3,271,325 | 9/1966 | Davies et al. | 252—466 |
| 3,278,268 | 10/1966 | Pfefferle | 136—86 |
| 3,337,369 | 8/1967 | Frazier | 136—86 |

ALLEN B. CURTIS, *Primary Examiner.*

U.S. Cl. X.R.

23—212